United States Patent
Thumm et al.

(10) Patent No.: US 10,819,201 B2
(45) Date of Patent: Oct. 27, 2020

(54) SQUIRREL-CAGE ROTOR AND METHOD FOR PRODUCING A SQUIRREL-CAGE ROTOR

(71) Applicant: Wieland-Werke AG, Ulm (DE)

(72) Inventors: Gerhard Thumm, Erbach (DE); Volker Voggeser, Senden (DE); Michael Wolf, Ulm (DE); Christoph Kästle, Ulm (DE)

(73) Assignee: WIELAND-WERKE AG, Ulm (DE)

( * ) Notice: Subject to any disclaimer, the term of this patent is extended or adjusted under 35 U.S.C. 154(b) by 116 days.

(21) Appl. No.: 16/154,246

(22) Filed: Oct. 8, 2018

(65) Prior Publication Data

US 2019/0149027 A1 May 16, 2019

(30) Foreign Application Priority Data

Nov. 16, 2017 (DE) .......... 10 2017 010 685

(51) Int. Cl.
*H02K 17/16* (2006.01)
*H02K 15/00* (2006.01)

(52) U.S. Cl.
CPC ....... *H02K 17/165* (2013.01); *H02K 15/0012* (2013.01); *H02K 2201/09* (2013.01)

(58) Field of Classification Search
CPC ... H02K 17/165; H02K 17/16; H02K 15/0012
See application file for complete search history.

(56) References Cited

U.S. PATENT DOCUMENTS

| | | | | |
|---|---|---|---|---|
| 5,338,996 A * | 8/1994 | Yamamoto | ........... | H02K 1/26 310/216.048 |
| 5,992,003 A | 11/1999 | Elliott et al. | | |
| 6,177,750 B1 * | 1/2001 | Tompkin | ............ | H02K 1/28 310/211 |
| 7,859,163 B2 * | 12/2010 | Bertocchi | ............ | B32B 7/08 310/216.048 |
| 8,456,056 B2 * | 6/2013 | Sanji | ............ | H02K 1/276 310/216.009 |

(Continued)

FOREIGN PATENT DOCUMENTS

| | | |
|---|---|---|
| DE | 3421 537 A1 | 12/1985 |
| DE | 19542962 C1 | 11/1996 |

(Continued)

OTHER PUBLICATIONS

German Office Action for corresponding application No. 2017 010 685.1, dated Aug. 27, 2018 (6 pages).

*Primary Examiner* — Edgardo San Martin
(74) *Attorney, Agent, or Firm* — Flynn Thiel, P.C.

(57) ABSTRACT

A squirrel cage rotor having a shaft, a rotor plate stack with rotor bars arranged in the interior thereof, and cage rings, wherein at least one part of a cage ring includes a disk stack, which is constituted as a layered structure of disks with cut-outs, through which the ends of the rotor bars project out of the rotor plate stack. Adjoining disks in the disk stack are mutually spaced, and form a gap. The clearance between two adjoining disks, resulting from the gap, is constituted by moldings which are arranged on the disks wherein, in the gap, at least in the region of the moldings, a joint connection is provided.

8 Claims, 2 Drawing Sheets

(56) References Cited

U.S. PATENT DOCUMENTS

| | | | | |
|---|---|---|---|---|
| 8,581,468 B2* | 11/2013 | Kudose | ............... | H02K 1/16 |
| | | | | 310/156.78 |
| 8,643,241 B2* | 2/2014 | Kleber | ............... | H02K 17/165 |
| | | | | 310/211 |
| 9,350,217 B2* | 5/2016 | Agapiou | ............ | H02K 15/0012 |
| 9,570,968 B1 | 2/2017 | Chen et al. | | |
| 10,361,612 B2* | 7/2019 | Heidrich | ............ | H02K 15/0012 |
| 2002/0047463 A1* | 4/2002 | Neuenschwander | .. | B21D 28/02 |
| | | | | 310/216.016 |
| 2007/0210667 A1* | 9/2007 | Vogel | ............... | B22D 19/0054 |
| | | | | 310/211 |
| 2013/0049516 A1 | 2/2013 | Kleber et al. | | |
| 2013/0127291 A1 | 5/2013 | Agapiou et al. | | |
| 2016/0079837 A1* | 3/2016 | Thumm | ............ | H02K 3/02 |
| | | | | 310/211 |

FOREIGN PATENT DOCUMENTS

| | | |
|---|---|---|
| DE | 10 2012 214 993 A1 | 3/2013 |
| JP | 4344139 A | 11/1992 |
| WO | 2012137235 A1 | 10/2012 |

* cited by examiner

SQUIRREL-CAGE ROTOR AND METHOD FOR PRODUCING A SQUIRREL-CAGE ROTOR

BACKGROUND AND SUMMARY OF THE INVENTION

The invention relates to a squirrel-cage rotor and to a method for producing a squirrel-cage rotor.

Known squirrel-cage rotors comprise a rotor plate stack which incorporates slots, and rotor bars of a good electrically-conductive material which are inserted in the slots. The ends of the rotor bars project above the end faces of the rotor plate stack and are silver soldered or welded to compact cage rings. The ends of the rotor bars project into machined annular slots in the cage rings, which constitute the bed for the silver solder and are filled with the latter. For the prevention of any delamination of the rotor plate stack, and of any spurious oscillations, separate and compact clamping rings are press-fitted to the end face of the rotor plate stack. In order to further prevent any axial displacement of the rotor bars in the slots of the rotor plate stack, these are permanently mechanically attached to the rotor plate stack.

A squirrel-cage rotor with a rotor winding is known from document DE 34 21 537 A1. The rotor winding comprises electrically-conductive rotor bars, which are arranged in closed slots in a rotor plate stack, and project above the end faces thereof. The projecting ends are connected to good electrically-conductive cage rings in a conductive manner. The cage rings, correspondingly to the rotor plates, are configured as slotted plate stacks of a good electrically-conductive material and, as end face compression elements, are permanently connected over their entire surface to the rotor bars in their closed slots, in close proximity to the rotor plate stack, in a thermally-conductive manner. A particular feature is provided, in that the individual constituent electrically-conductive plates of the cage rings are of a greater thickness than the rotor plates, but are otherwise of the same size and shape as the latter. During the manufacture of a squirrel-cage rotor, the cage rings and the rotor plates are stacked together, the rotor bars are inserted at the end face thereof and thereafter, under the action of axial compression applied to the entire stack, the ends of the rotor bars are silver soldered to the cage rings.

A squirrel-cage rotor with cage rings for application in an asynchronous machine is further known from document DE 195 42 962 C1. The cage rings are comprised of copper plates, which are mutually spaced, and which form cooling ducts between the plate layers. Clearances between the copper plates are maintained by corresponding spacers. In the arrangement of the cage rings, the joint formed by solder extends in the axial direction of the squirrel-cage rotor, along the rotor bars, into the rotor plate stack, as a result of which end disks can be omitted.

The object of the invention is the further development of a squirrel-cage rotor, with respect to an improvement of the cage rings.

The invention is described with respect to a squirrel-cage rotor and with respect to a method for producing a squirrel-cage rotor. The further advantageous configurations and further developments of the invention are also described.

The invention comprises a squirrel-cage rotor, having a shaft, a rotor plate stack with rotor bars arranged in the interior thereof, and cage rings, wherein at least one part of a cage ring is comprised of a disk stack, which is constituted as a layered structure of disks with cut-outs, through which the ends of the rotor bars project out of the rotor plate stack. According to the invention, adjoining disks in the disk stack are mutually spaced, and form a gap.

The clearance between two adjoining disks, resulting from the gap, is constituted by moldings which are arranged on the disks, wherein, in the gap, at least in the region of the moldings, a joint connection is provided. The squirrel-cage rotor is specifically intended for application in an asynchronous machine.

The invention proceeds from the consideration whereby, further to the joining process, the rotor plate stack, with the shaft and the cage rings, constitutes a compact squirrel-cage rotor component. Rotor bars are routed through the rotor plate stack and the cage rings, and are connected to the material of the cage rings in an electrically conductive manner. To this end, in relation to the rotor plate stack, the rotor bars are configured with an excess length, such that the latter project into cut-outs in the cage rings. The cage rings are positioned on the shaft, on both sides of the rotor plate stack. Each cage ring is itself comprised of a disk stack, which is constituted by a plurality of individual disks of identical diameter. The disks themselves, on the disk surface, incorporate cut-outs in an equal number to the rotor bars required for the constitution of a squirrel-cage rotor. These individual components, which are initially detachably arranged in relation to one another, must be connected to form a compact squirrel-cage rotor.

The joining process proceeds from the shell surface of each cage ring. Where the geometry of a disk is considered as a cylinder, the shell surface is the end-facing envelope or circumferential surface, i.e. the outermost region of the surface in the radial viewing direction. The base or top surfaces of the cylinder are then the surfaces which are perpendicular to its axis of rotation. By means of the moldings which are configured on the disks, the adjoining disks arranged in a disk stack are spaced from one another, as a result of which a respective gap is constituted. In the respective gap, at least in the region of the moldings, a joint connection is provided. The joint connection, specifically originating from the shell surface, can extend radially inwards only as far as the moldings, and can enclose the latter. However, the joint connection can also occupy the entire respective gap between two disks. By means of the joining material, the rotor bars are connected to the disks of a cage ring in an electrically conductive manner. The moldings configured on the disks, from a radial viewpoint, lie within the cut-outs which are provided for the rotor bars.

The solution according to the invention provides a particular advantage, in that the individual disks are produced from a strip material, in a cost-effective manner, by punching and embossing. By means of the moldings, a defined joint gap can be set between the disks, and between the rotor bars. A clearance defined by the moldings for the first disk on the rotor plate stack can be employed as a residual gap for cooling purposes.

In a preferred configuration of the invention, the joint connection can be a soldered connection. Originating from the shell surface, the solder can be separately introduced into a gap, by means of thermal treatment. By this arrangement, a strictly demarcated, yet adequate joining region is constituted, at least in the outer region in the vicinity of the shell surface of a cage ring. By means of soldered connection, this joining region provides adequate mechanical strength for the entire assembly. Satisfactory electrical contact between the rotor bars and the cage rings is likewise established.

Advantageously, the moldings can be configured to a step-wise design. The moldings comprise a given contact surface which, in the cage ring, engages in contact with the adjoining disk. Specifically, rectangular step shapes consequently deliver adequate stability, and provide an accurately-defined gap width.

In a further preferred configuration of the invention, indentations can be configured on the reverse side of the moldings. The indentations are specifically configured such that at least a given proportion by volume of appropriate moldings on an adjoining disk can engage in said indentations in a precisely fitted manner. In a disk stack of a cage ring, this provides a degree of mutual meshing between the individual disks.

Advantageously, the indentations can be configured to a step-wise design. The step geometry can be configured here such that a rectangular step shape interlocks with a molding in a precisely fitted manner.

In a further advantageous configuration of the invention, the moldings on one disk can, in part, engage with the indentations in an adjoining disk. By means of partial engagement, recesses for the formation of a joint connection and additional voids can be constituted in the immediate vicinity of the moldings on a disk, which are filled with a joining material. By this arrangement, an additional material bond, and thus an improved joint connection, is provided between the individual disks.

In an advantageous form of embodiment of the invention, the moldings on one disk can engage with the undercut indentations in an adjoining disk. Appropriate moldings can engage with the undercut indentations under the action of a degree of tension and thus provide additional solidarity between adjoining disks.

In a preferred form of embodiment of the invention, the volume of a respective indentation can be only partially occupied by a molding which engages with said indentation, as a result of which solder from the joint connection fills the residual volume of the indentation which is accessible via the gap. Accordingly, in comparison with exclusively flat disks, the overall proportion of the joint surface is enlarged, and the mutual connection of two disks is thus improved.

A further aspect of the invention comprises a method for producing a squirrel-cage rotor according to the invention by the following sequential steps:

Provision of a sheet metal blank for a disk,
Punching of cut-outs for the rotor bars,
Embossing of moldings or indentations in the disk,
Installation of the disks in a disk stack of a cage ring,
Arrangement of the cage rings on a rotor disk stack, together with rotor bars and a shaft,
Formation of a joint connection by the introduction of solder into the respective gap configured between adjoining disks, at least in the region of the moldings.

Further exemplary embodiments of the invention are described in greater detail with reference to the figures.

DETAILED DESCRIPTION

In all the figures, mutually corresponding parts are identified by the same reference numbers.

Figure 1:
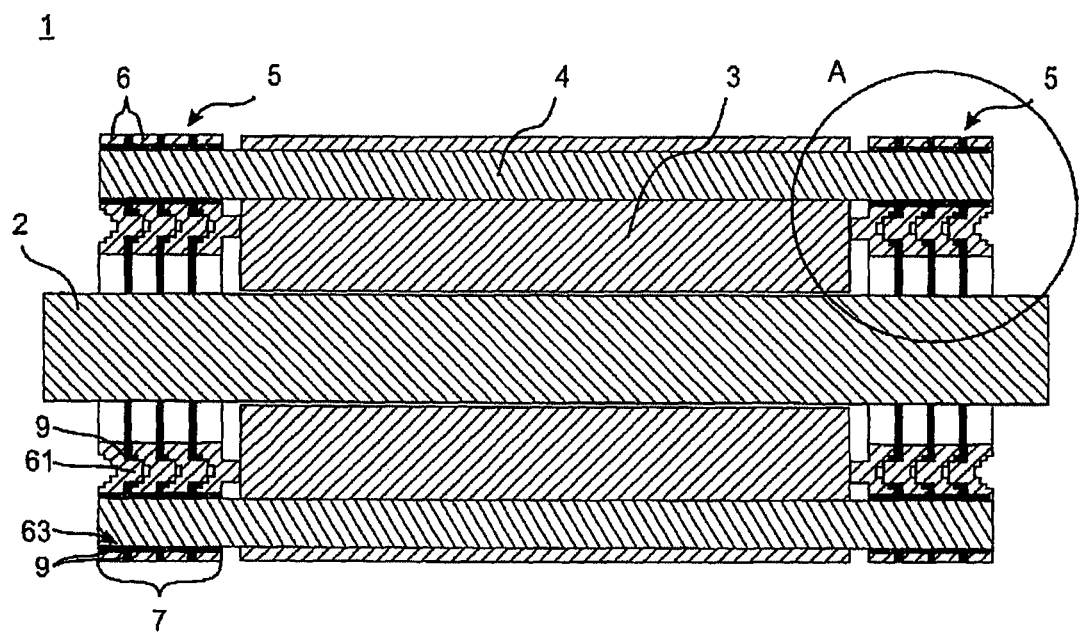
FIG. 1 shows a schematic longitudinal section of a squirrel-cage rotor.

FIG. 1 shows a schematic longitudinal section of a squirrel-cage rotor 1. In this state, the rotor plate stack 3 is positioned on the shaft 2, in combination with two cage rings 5, which enclose the rotor plate stack 3 on the end faces thereof. A plurality of rotor bars 4 are arranged in the interior of the plate stack 3 and the cage rings 5. The bar ends of the rotor bars 4 project into cut-outs 63 in the cage rings 5, and terminate flush to the respective outermost disk 6 in the disk stack 7. As a result of the moldings 61 configured in the disks 6, adjoining disks 6 in the disk stack 7 are mutually spaced.

In this case, a disk stack 7 is comprised of four disks 6 which, from the shell surface outwards, which constitutes the end face of the respective disks 6, are connected over the outer circumference thereof by means of soldered connections 9. The soldered connections 9 extend radially inwards in the direction of the shaft 2. In the configuration represented, the soldered connections 9, viewed radially, extend fully to the interior, and enclose the moldings 61. In the case represented, as a result of the presence of a given residual gap, the material of the soldered connections 9 also penetrates axially between the cut-outs 63 and the rotor bars 4.

Figure 2:
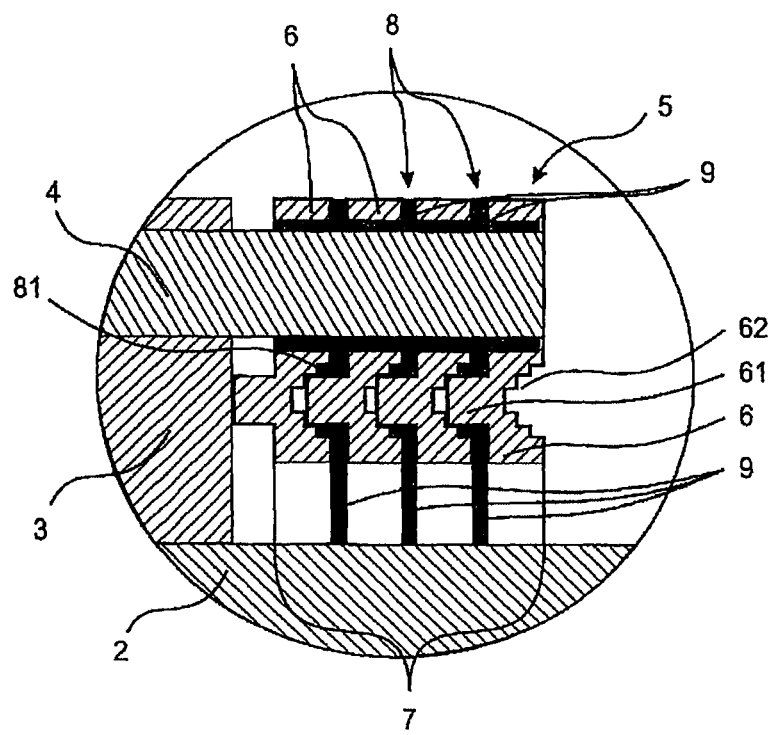
FIG. 2 shows a detailed section of FIG. 1, in region A of the cage rings.

FIG. 2 shows a detailed section of FIG. 1, in region A of the cage rings. The disk stack 7 of a cage ring 5 is constituted by a plurality of individual disks 6 of equal diameter. Each disk 6 incorporates moldings 61 by means of which, upon the stacking of the disks 6 to form a disk stack 7, a gap 8 is constituted between adjoining disks 6. By way of a joint connection 9, solder is introduced into the respective gap 8. The moldings 61 are formed by a punching process, wherein corresponding indentations 62 are configured on the reverse side of the moldings 61. The moldings 61 and the indentations 62 are configured to a step-wise design, such that they fit together in pairs. In this manner, the moldings 61 on one disk 6, to a certain extent, engage with the indentations 62 in an adjoining disk 6. The volume of a respective indentation 62 is only partially occupied by a molding 61 which engages with said indentation. By this arrangement, solder from the joint connection 9 can penetrate the residual volume 81 of the indentation 62 which is accessible via the gap 8. The cage ring 5 encloses the shaft in an annular manner and, as a compact component, is connected to the rotor bars 4 in a good electrically conductive manner.

Figure 3:
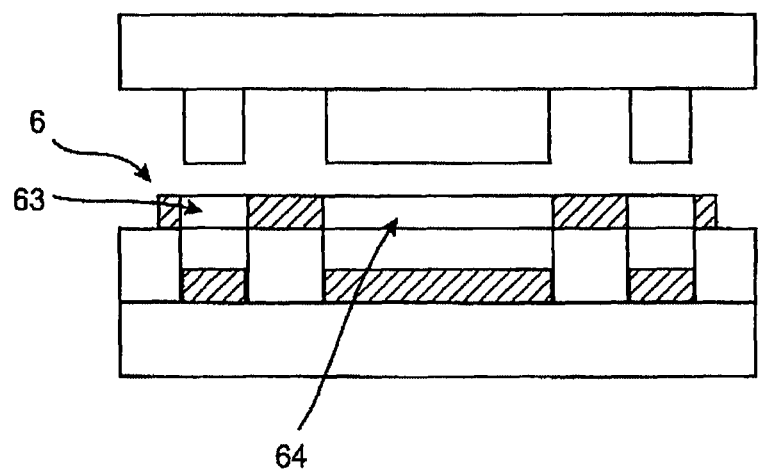
FIG. 3 shows a schematic representation of the process for the punching of cut-outs in a disk.

FIG. 3 represents one of the first process steps, whereby cut-outs 63 for the rotor bars and central cut-outs 64 for the shaft are punched out of a sheet metal blank to form a disk 6. The size of the central cut-outs 64 can be selected such that an annular disk 6 is constituted, the diameter of which can also be significantly larger than the shaft diameter.

Figure 4:
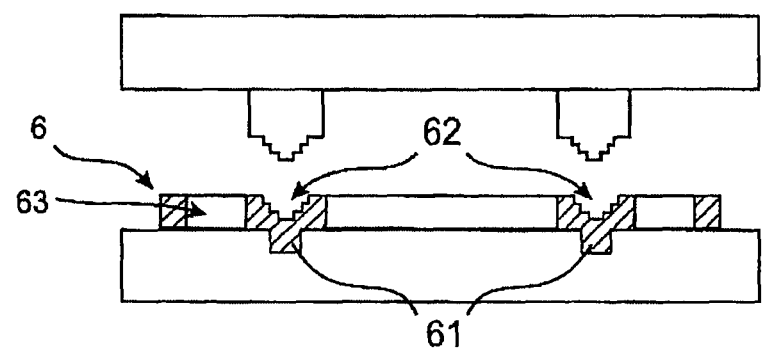
FIG. 4 shows a schematic representation of the process for the embossing of moldings in a disk.

FIG. 4 shows a further process step, whereby moldings 61 and indentations 62 are embossed into a disk 6. The embossing tool generates a multi-stepped profile in the indentations 62. The stepping of the indentations 62 is executed such that the latter interlock with the moldings 61 on an adjacently arranged disk 6, upon the connection thereof.

LIST OF REFERENCE SYMBOLS

1 Squirrel-cage rotor
2 Shaft
3 Rotor plate stack
4 Rotor bar
5 Cage ring
6 Disk
61 Moldings
62 Indentations
63 Cut-out for rotor bar 64 Central cut-out
7 Disk stack
8 Gap
81 Residual volume
9 Joint connection, soldered connection
A Detailed image section

The invention claimed is:

1. A squirrel-cage rotor for an asynchronous machine, comprising a shaft, a rotor plate stack with rotor bars arranged in the interior thereof, and cage rings, wherein at least one part of at least one of the cage rings is comprised of a disk stack, which is constituted as a layered structure of disks with cut-outs, through which the ends of the rotor bars project out of the rotor plate stack, wherein:
   adjoining disks in the disk stack are mutually spaced, and form a gap,
   the clearance between two adjoining disks, resulting from the gap, is constituted by moldings which are arranged on the disks,
   in the gap, at least in the region of the moldings, a joint soldered connection is provided, and
   material of the soldered connection also penetrates axially between the cut-outs and the rotor bars.

2. The squirrel-cage rotor according to claim 1, wherein the moldings are configured as a step-wise design.

3. The squirrel-cage rotor according to claim 1, wherein indentations are configured on a reverse side of the moldings.

4. The squirrel-cage rotor according to claim 3, wherein the indentations are configured as a step-wise design.

5. The squirrel-cage rotor according to claim 3, wherein the moldings on one disk, in part, engage with the indentations in an adjoining disk.

6. The squirrel-cage rotor according to claim 5, wherein the moldings on one disk engage with the indentations that are undercut in an adjoining disk.

7. The squirrel-cage rotor according to claim 5, wherein the volume of a respective indentation is only partially occupied by the molding which engages with said indentation, as a result of which solder from the soldered connection fills a residual volume of the indentation which is accessible via the gap.

8. A method for producing a squirrel-cage rotor according to claim 1, comprising the following sequential steps:
   providing a sheet metal blank for each of the disks,
   punching cut-outs for the rotor bars and the shaft,
   embossing moldings or indentations in each of the disks,
   installing the disks in the disk stack of the at least one of the cage rings,
   arranging the cage rings on the rotor plate stack, together with the rotor bars and the shaft, and
   forming the soldered connection by the introduction of solder into the respective gap configured between adjoining disks, at least in the region of the moldings and also axially between the cut-outs and the rotor bars.

* * * * *

UNITED STATES PATENT AND TRADEMARK OFFICE
CERTIFICATE OF CORRECTION

PATENT NO. : 10,819,201 B2
APPLICATION NO. : 16/154246
DATED : October 27, 2020
INVENTOR(S) : Gerhard Thumm et al.

Page 1 of 1

It is certified that error appears in the above-identified patent and that said Letters Patent is hereby corrected as shown below:

In the Claims

Claim 1, Column 5, Lines 20-21; change "moldings, a joint soldered" to -- moldings, a soldered --

Signed and Sealed this
Twenty-second Day of December, 2020

Andrei Iancu
*Director of the United States Patent and Trademark Office*